US007818586B2

(12) United States Patent
Witt et al.

(10) Patent No.: US 7,818,586 B2
(45) Date of Patent: Oct. 19, 2010

(54) SYSTEM AND METHOD FOR DATA ENCRYPTION KEYS AND INDICATORS

(75) Inventors: Russell A. Witt, Plano, TX (US);
Timothy R. Bruce, Carrollton, TX (US);
David L. Helsley, Glastonbury, CT (US);
Osvaldo A. Ridner, Folsom, CA (US);
John M. Casey, Carrollton, TX (US)

(73) Assignee: Computer Associates Think, Inc., Islandia, NY (US)

( * ) Notice: Subject to any disclaimer, the term of this patent is extended or adjusted under 35 U.S.C. 154(b) by 1219 days.

(21) Appl. No.: 11/405,936

(22) Filed: Apr. 18, 2006

(65) Prior Publication Data
US 2007/0113104 A1 May 17, 2007

Related U.S. Application Data

(60) Provisional application No. 60/735,531, filed on Nov. 11, 2005.

(51) Int. Cl.
*G06F 12/14* (2006.01)
(52) U.S. Cl. ..................................................... 713/193
(58) Field of Classification Search ........................ None
See application file for complete search history.

(56) References Cited

U.S. PATENT DOCUMENTS

| 5,796,825 A | 8/1998 | McDonnal et al. ............. 380/4 |
| 5,953,419 A | 9/1999 | Lohstroh et al. ............... 380/21 |
| 6,249,866 B1 | 6/2001 | Brundett et al. ............. 713/165 |
| 2003/0110131 A1* | 6/2003 | Alain et al. ..................... 705/51 |
| 2003/0191952 A1 | 10/2003 | Anderson et al. ........... 713/189 |
| 2007/0036356 A1* | 2/2007 | Holzapfel et al. ........... 380/201 |

FOREIGN PATENT DOCUMENTS

| EP | 0 774 715 A1 | 5/1997 |
| EP | 1 320 014 A2 | 6/2003 |

OTHER PUBLICATIONS

PCT Notification of Transmittal of the International Search Report with attached PCT International Search Report and Written Opinion of the International Searching Authority in International Application No. PCT/US2006/043189 filed Nov. 7, 2006 (10 pages), Mailed Feb. 27, 2007.

* cited by examiner

*Primary Examiner*—Brandon S Hoffman
(74) *Attorney, Agent, or Firm*—Baker Botts L.L.P.

(57) ABSTRACT

Systems and methods are provided for encrypting data, generating encryption keys, and generating encryption indicators. The encryption indicators may be stored on a storage medium in a location separate from the location of stored encrypted data. The encryption indicator includes information indicative of the encryption key used for encrypting and decrypting the data. In one example, the storage medium is a tape, and the encryption indicator is stored in the user header label of the tape.

33 Claims, 2 Drawing Sheets

SYSTEM AND METHOD FOR DATA ENCRYPTION KEYS AND INDICATORS

CROSS-REFERENCE TO RELATED APPLICATIONS

This application claims the benefit of priority under 35 U.S.C. §119(e) of U.S. Provisional Application Ser. No. 60/735,531 filed Nov. 11, 2005.

TECHNICAL FIELD OF THE INVENTION

This invention relates generally to data encryption and, more particularly, to a system and method for storing data encryption keys and indicators.

BACKGROUND OF THE INVENTION

There has been a need for some time for an easy-to-use encryption product (e.g., for mainframe computers). In particular, tape data that leaves the secure confines of a data center would benefit from an easy-to-use encryption mechanism.

Some have stored an encrypted copy of an encryption key within the first block of the data being encrypted. Some other encryption products rely strictly on manual processes to keep track of which key needs to be used to read which tapes. Another non-mainframe product that stores an encrypted copy of the key on the tape stores the key in a data header-block. The first block of data written by the application and for use by the application reading the data contains information including the encryption key.

Other products allow data to be copied from tape (or disk) to another tape in an encrypted form. So, if an application writes a two-volume tape file, then the application can copy that file (or files) to another two-volume tape file in an encrypted form. Then, to read the data at (e.g., a disaster recovery location or at the receiving data center), the encrypted two-volume tape file has to be re-copied and un-encrypted back onto a two-volume tape file that is not encrypted. Then, the application can read the un-encrypted two-volume tape file as input. This means writing the data twice and reading the data twice, as well as keeping track of the file name and relationship between the original data, the encrypted copy, and the un-encrypted copy.

SUMMARY

Various embodiments are generally directed to providing encryption keys and indicators on storage media. While certain embodiments may refer to the use of tapes as a storage medium, the concepts described herein may also be applied to other storage media, such as disks. In some cases an encryption indicator including information about an encryption key used to encrypt and/or decrypt data may be stored on the storage medium containing the encrypted data, but in a location separate from the encrypted data. For example, the encryption indicator may be stored in a user label on a tape.

In one embodiment, a data storage device is provided. The device includes a storage medium and a set of encrypted data stored on the storage medium. The device also includes an encryption key operable to enable a user to decrypt the encrypted data. The device further includes an encryption indicator corresponding to the encryption key. The encryption indicator is stored on the storage medium in a location separate from a location of the set of encrypted data.

In another embodiment, a data encryption system for encrypting data is provided. The system includes a database, and an encryption application operable to encrypt data in a file being created on a storage medium. The system also includes an encryption utility operable to recognize an encryption request and intercept a file creation process if the encryption request indicates that the data is to be encrypted. The encryption utility is further operable to call the encryption application to encrypt the data. The encryption application is further operable to generate an encryption key corresponding to the encrypted data to enable a user to decrypt the data. The encryption utility is further operable to generate encryption indicator information corresponding to the encryption key. The encryption indicator information is stored in a location on the storage medium separate from a location wherein the encrypted data is stored.

In another embodiment, a method is provided for storing data on a storage medium. One step is determining whether the data is to be encrypted. Another step is, if the data is to be encrypted, generating an encryption key. Another step is generating an encryption indicator associated with the encryption key. Another step is encrypting the data and storing the encrypted data on the storage medium in a first location. Another step is storing the encryption indicator on the storage medium in a second location separate from the first location.

Certain embodiments may provide certain advantages, some of which are indicated below. It should be understood that any particular embodiment may provide some, none, or all of the described advantages.

One advantage is that an encryption key may be stored on a storage medium in a location separate from the encrypted data. Thus, the encryption key does not affect the encrypted data. Another advantage is that an encryption key may be stored in a user label on the storage medium. Another advantage is that an unencrypted portion of a storage medium may contain information associated with an encryption key, which enables decryption of encrypted date on the storage medium. Another advantage is the encryption keys may be generated and stored and encryption indicator information maintained on a storage medium having encrypted data may be used to enable the retrieval of an appropriate encryption key for decrypting the encrypted data. Another advantage is that a data center may create many tape files with different encryption keys and yet be able to read them back without having to specify in advance which key needs to be used to read the data.

BRIEF DESCRIPTION OF THE DRAWINGS

For a more complete understanding of the present invention and for further features and advantages, reference is now made to the following description, taken in conjunction with the accompanying drawings, in which.

DETAILED DESCRIPTION

Figure 1:
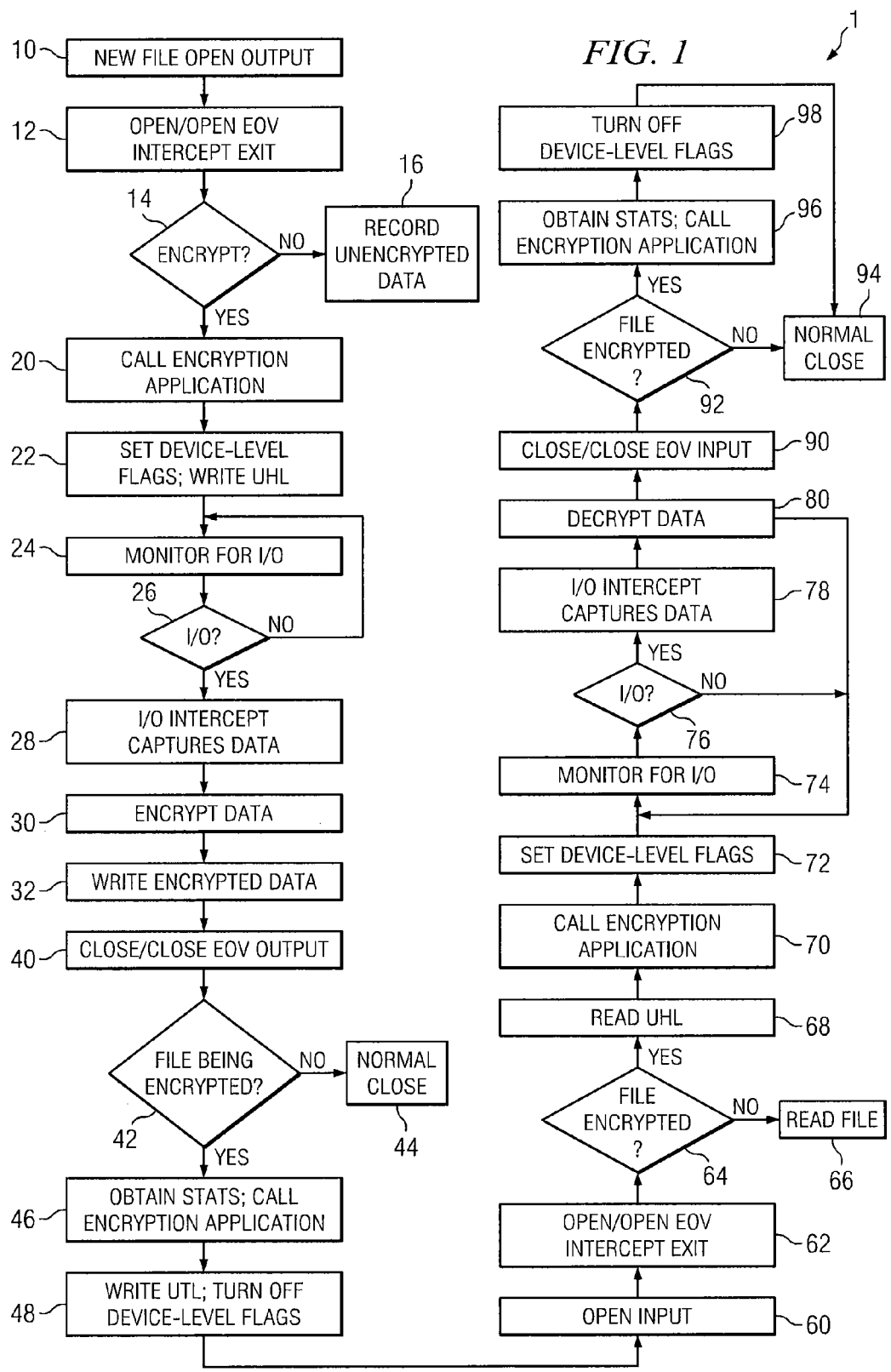
FIG. 1 illustrates an example method of data encryption and storage in accordance with an embodiment of the present invention.

Various embodiments are generally directed to providing encryption keys and indicators on storage media. While certain embodiments may refer to the use of tapes as a storage medium, the concepts described herein may also be applied to other storage media, such as disks.

Storage management has generally referred to managing data on tape and disk devices. Data on tape may be lost, for example, either while at a disaster recovery organization or in transit from one data center to another. While tapes may be lost in transit, or misplaced and misfiled at disaster recovery sites, recent changes in laws require public disclosure when lost data might be related to individual financial or medical information. This public disclosure requirement has forced many companies to attempt to better protect all data that is not stored in a secure data center.

On a mainframe, tapes may be used for both backup (e.g., for historical reasons) or disaster-recovery purposes. Tapes may be also be used for other purposes. In most cases, tapes created on a mainframe today have what are called "Standard Labels." These are similar to ANSII Labels, but follow an IBM Standard Label format. These Standard Labels have the flexibility of having User-Header Labels (UHLs) included in them without affecting the data itself, just like ANSIL Labeled tapes.

When a file is encrypted, the encryption key(s) must be transported or stored in order to read the file at another location and/or at the same location at a later date. Although some have provided encryption keys within data blocks, there does not exist dynamically written UHLs which contain information about the data file itself, and there previously has not been a system or process in which an encrypted key has been stored within the UHLs themselves.

In a related issue, while some specific products (for example, with respect to backup products) have started to address encryption, this is only a partial solution. Data centers need the ability to have any application that writes data on tape to have the data encrypted without regard for the application writing the data. And, since one of the reasons for putting the data on tape is the easy portability of the media (to be able to write it on one tape at one data center, ship it to another data center, and be very sure that there will be a device capable of reading the tape), it is preferable that the encryption process is not be limited to one type of tape device that may or may not be available at all other data centers. What is needed is a system to allow any application that writes any file to tape to be able to have the data encrypted, without regard for the application writing the data and without regard for the type of tape device being written to.

In one example scenario concerning encryption keys and indicators, if a tape file is being moved from one site to another, the encryption key itself would be transported to the other site. This can be done either on a separate portable storage medium (e.g., written on a note in a sealed envelope, email, etc.) or by storing the data encryption key on the same storage medium in an encrypted form. One way to provide the necessary encryption is to store an encryption indicator in the Header-Labels of the encrypted tapes. The encryption indicator may contain information about the encrypted data, information about the encryption key(s), an indication of the location of the encryption key(s), an indication of the existence of the encryption key(s), an indication of the type of encryption key(s), the form/format of the encrypted data, or other information related to the encrypted data and/or the encryption key(s). Among other things, the encryption indicator may serve as a pointer to the encryption key(s). In alternative embodiments, a relatively small amount of data (compared with the encrypted data) may be stored as the encryption indicator, or in addition to the encryption indicator. This data may be stored in an encrypted form (e.g., using the same encryption key) within the tape label. This will allow for a validation that the correct key is being used to un-encrypt the data when it is being read as input.

The encrypted data encryption key can be stored in a location on the storage medium which is discrete from the location of the encrypted data. For example, on tapes, the encryption key may be stored adjacent the encrypted data or in the User-Header-Labels and/or User-Trailer-Labels (UHLs/UTLs). If a tape must be shipped to another location, then the data encryption key itself may be encrypted using the receiver's Public Key and stored in encrypted form in the Header-Labels instead of an encryption indicator. If the encryption key is being transported with the data, it can either reside "inside" the data itself (e.g., in the first block of data) or it can reside "next to" the data. By storing the data encryption key in the UHLs/UTLs it is not part of the actual encrypted data. An advantage of not having the data encryption key in the data itself is that the application writing the data does not have to be aware that there is anything "extra" in the data. This allows for any application to have its data encrypted without its knowledge.

In another scenario, the data is referenced at the same location at a later date. Here, the data encryption key can be stored on any portable or non-portable storage media (e.g., written on a note in a sealed envelope, email, DASD dataset or DASD database, etc.). However, if the data encryption key is stored on non-portable DASD, then an indicator may be provided to correlate which tape file needs to use which data encryption key. This correlation may be done by storing the name of the data encryption key in the UHLs/UTLs. Again, the same advantage is provided here as in the scenario considered above. The application writing the data does not have to be aware that there is anything "extra" in the data and this allows for any application to have its data encrypted without its knowledge.

According to an example embodiment, as illustrated in FIG. 1, a method 1 is shown for providing encryption services. At step 10, a new file open output process 13 is initiated. At step 12, when a new tape file is being created, an operating system intercept obtains control of the file creation process. The intercept checks to see if the file being created needs to be encrypted or not (e.g., based on file name, job name, or any other criteria). At step 14, a determination is made whether the file needs to be encrypted. If the file does note need to be encrypted, no calls are made to the encryption application and data may be stored (unencrypted) on the storage medium at step 16 as desired. From this point the method ends at step 18. If the file does need to be encrypted, then, at step 20, the encryption application is called to provide encryption services. At this point, the encryption application may, among other things generate and/or specify one or more encryption keys and/or processes to be used in encrypting the data. Also, at step 22, certain flags are set at the device level to indicate that input/output (I/O) to this device needs to be processed through the encryption process and to indicate which encryption key(s) should be used. Also at this point, the UHLs are written to the tape before any data is actually written to the tape. At step 22, an encryption indicator is also generated. The encryption indicator may contain information about the encrypted data and/or the encryption key(s) and processes. For example, a key name (and/or other information about the encrypted data, encryption key, etc.) may be stored as an encryption indicator in the tape labels created with each file. In the case of other storage media, the encryption indicator may be stored in a similar location discrete from the encrypted data. The encryption indicator may indicate that the file is encrypted and also may indicate the name, type, location, etc. of the encryption key(s) used to encrypt the data.

At step 24, the data system is monitored for a WRITE event, or some other event in which I/O is activated and data is actually going to be written. At step 25, a determination is made whether there is such an event. At step 28, when actual I/O to the device takes place, another intercept gets control, tests to see if the file needs to be encrypted, and if so, uses the specified key and encrypts the data before it is written to device. This is preferably a low-level intercept that gets control on all I/O to the device.

At step 30, data is encrypted and stored. Preferably, the data is encrypted as it is written, rather than being written, then encrypted, then stored.

At step 40, the OPEN/CLOSE/EOV intercept will get control during a CLOSE event. At step 42, the intercept will determine if encryption had been performed. If not, then normal CLOSE processing will continue at step 44. If encryption services have been performed, then step 46 will call the encryption application and obtain and process the stats on the encryption operation. At step 48, the UTL will be written and the device level flags will be turned off to prevent any further encryption services for this device.

At step 60, the data system is monitored for a READ event, or other similar event in which the encrypted data needs to be encrypted/decrypted. At step 64, a determination is made whether the file being read was already encrypted. At step 62, when an existing tape file is opened for input (i.e., read) processing, the first operating system intercept again gets control. It reads and analyzes the tape labels of the file being opened (step 68) to determine if the file has been encrypted and which key was used. It then makes a test-call to the encryption services application (step 70), or module, to determine if the encryption indicator is defined and if the information stored in the tape labels can be successfully un-encrypted (thus checking that the correct indicator is being used). If so, it again sets flags at the device level to indicate that un-encryption services are required and to indicate the name of the indicator to use to un-encrypt the tape file (step 72).

At step 78, when the actual I/O to the device takes place, the second low-level I/O intercept again gets control. This time it un-encrypts the data as it is read from the tape device and before the I/O buffer is returned to the actual application reading the tape file. The method then continues until a CLOSE is detected. The CLOSE process for a READ is similar to a WRITE except no UTLs are written (steps 90-98).

The actual check to see if a file being created needs to be created with encryption or not can be based on many criteria. For a z/OS product, for example, an existing system called SMS may be used. This system (SMS) already exists on z/OS operating systems and has the ability to group files by file name, creating job name, and many other criteria.

The system may also incorporate an administration portion that allows the creation of an encryption key based on a pass-phrase. This encryption key may be stored in a secure file referenced only by an indicator or token. This prevents anyone from ever seeing the actual encryption key. However, use of the same pass-phrase allows the same encryption key to be regenerated (e.g., at a different data center or at a disaster recovery location).

According to an alternative embodiment, the operating system itself may be enhanced to allow the same process to be performed as part of the basic I/O system. An administration task allows an encryption key to be entered into the system and to direct which key needs to be used for both the encryption and un-encryption processes.

The following is a diagram to show the structure of IBM Standard Labels.

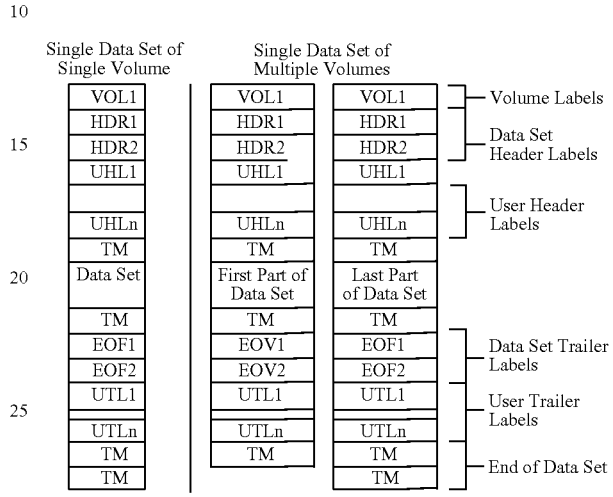

Single Data Set/Single Volume: The volume label is followed by the data set header labels and optional user header labels. The data set is preceded and followed by a tapemark. The data set trailer labels are identified as EOF and followed by optional user trailer labels. Two tapemarks follow the trailer label group to indicate that the data set is the last data set on the volume and is not continued on another volume.

Single Data Set/Multiple Volumes: More than one volume is needed to contain the data set. The last volume is organized the same as a single volume. On the other volumes, the data set trailer labels are identified as EOV instead of EOF, and the trailer label group is followed by one tapemark instead of two. The data set and user labels are repeated on each volume, and there is a separate volume label for each tape.

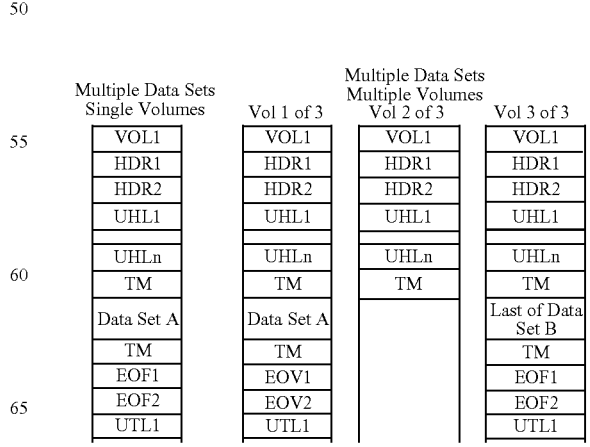

-continued

| UHLn | UHLn | Data Set B Continued | UHLn |
|---|---|---|---|
| TM | TM | | TM |
| HDR1 | HDR1 | | HDR1 |
| HDR2 | HDR2 | | HDR2 |
| UHL1 | UHL1 | | UHL1 |
| UTLn | UTLn | | UTLn |
| TM | TM | | TM |
| Data Set B | Data Set B | | Data Set C |
| TM | TM | TM | TM |
| EOF1 | EOV1 | EOV1 | EOF1 |
| EOF2 | EOV2 | EOV2 | EOF2 |
| UTL1 | UTL1 | UTL1 | UTL1 |
| UTLn | UTLn | UTLn | UTLn |
| TM | TM | TM | TM |
| TM | | | TM |

Multiple Data Sets/Single Volume: The tape begins with a volume label. Each data set is preceded by a header label group and a tapemark and is followed by a tapemark and a trailer label group. The data set trailer labels are identified as EOF. Each trailer label group is followed by a tapemark; the trailer label group for the last data set on the volume is followed by two tapemarks.

Multiple Data Sets/Multiple Volumes: This is called aggregate. More than one volume is needed to contain the data sets. Each volume begins with a volume label. The last volume is organized the same as a multiple data set/single volume layout, except that the first data set begins on an earlier volume. On the other volumes, the data set trailer labels at the end of the tape are identified as EOV instead of EOF, and the last trailer label group is followed by only one tape mark.

In an example embodiment, the actual data that is stored in the 8 80-byte records is actually limited to 8 76-byte records (4 bytes in each record is reserved for UHLx or UTLx ) and is mapped with the following csect;

```
CRYPTCOM DSECT
CRYPTLEN DC XL2'0000'        * Length of the entire block
**           * including this 2-byte field
CRYPTID DC CL4'BC00'         * BTE Common block version 00
**           * ID = 'TCxx' for test tapes
CRYPTVER DC CL8' '           * Version of BTE that created this
CRYPTSID DC CL1' '           * The subsys # (BTE1, BTE2, ...)
CRYPTAID DC AL1(0)           * Algorithm Id
CRYPTPAD DC AL1(0)           * Algorithm padding method
CRYPTHM DC AL1(0)            * Key verification hash method
      DC AL2(0)              * Reserved for future use
CRYPTKID DC AL4(0)           * The BTE DB unique id
CRYPTHSH DC XL16'00'         * Key verification hash
CRYPTSIG DC XL16'00'         * Key verification signature
CRYPT$LN EQU *-CRYPTCOM      * Length of the common section
**
** Map of header section for internal (non-RSA) tapes
**
INTTAPE DSECT
INTID DC CL4'BS00'           * BTE Symmetric block version 00
INTKEYLN DC F'0'             * Key length
INTTBLNM DC CL32' '          * The BTE DB table name
INTBTEKY DC CL32' '          * The BTE DB key name
INTCSFKY DC CL64' '          * The ICSF key label
INT$LN EQU *-INTTAPE         * Length of the internal tape sec
**
** Map of header section for B2B (RSA) tapes
**
```

-continued

```
B2BTAPE DSECT
B2BID DC CL4'BA00'           * BTE Asymmetric block version 00
B2BDSLBL DC CL32' '          * The digital certificate label
B2BSYMLN DC AL2(0)           * The length of the symmetric key
B2BSYMKY DS 0C               * The symmetric key
B2B$LN EQU *-B2BTAPE         * Length of the B2B tape sec
```

The encryption indicator information stored in the User-Labels may be either the data-encryption-key (which itself may be encrypted using the public-key of the receiver) or the name of the data-encryption-key, which may be stored, for example, in the common secure key database. Other types of information may be stored in the labels (or other locations) as discussed above. An example methodology is to intercept the actual OPEN/CLOSE/EOV event at that time the special "User-Label" exit is dynamically installed. Then, when the "User-Label" exit is invoked, the actual data (mapped by the CRYPTCOM) may be copied into the 8 User-Header-Labels or User-Trailer-Labels.

In a specific example embodiment, a system is provided for encrypting data and generating and storing encryption keys and encryption indicators. Among other things, the system provides a method for employing symmetric keys in encrypting tape data sets. This has the advantage of enabling the recreation of the encryption keys through the use of "pass phrases" which can reflect something that is more meaningful to a user than a key in the form of a 16-, 24- or 32-byte binary string. If the user remembers the original pass phrase that was used to encrypt the tape files, then the user can regenerate the actual encryption keys using the encryption system.

The system also allows the user to create tapes destined for another data center. The receiving data center can generate the same key for decrypting data if they are given the pass phrase, which may be exchanged via telephone, secure e-mail or any of a wide variety of methods.

Figure 2:
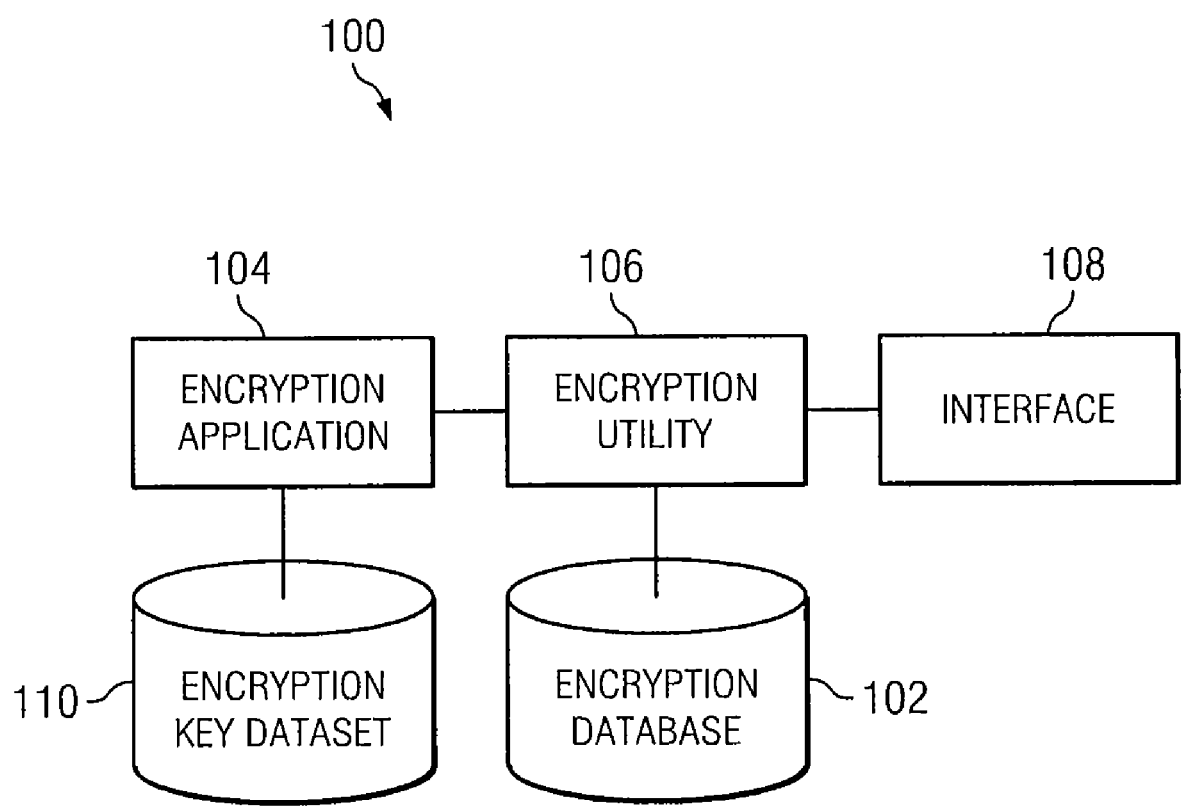
FIG. 2 illustrates an example system for encrypting and storing data in accordance with an embodiment of the present invention.

An example system 100 is illustrated in FIG. 2. System 100 includes an encryption database 102. Preferably, encryption database 102 is operable to handle the merging and separating of data centers by employing a key table structure. In a simple environment there is one key table with a default name. This one table is the primary table and is used for all encryptions performed in the data center. If two data centers merge, the key table is exported from one system and imported into the other system. The imported key table is referenced for decrypting tapes that were merged into the data center. The original key table is the primary table and any new encrypting is done based on the original key table. Thus, each key table can contain a key with the same keyname, but whose encryption key is different.

The key table name and the keyname are preferably stored on the tape. The exact size of the key, therefore, is not limited by the free space in the header label. This allows one to define varying encryption strengths depending on the locale of the relevant data center and international legal restrictions. It also removes all traces of the underlying encryption key from the data that has been encrypted with it. This methodology also then allows the encryption to be controlled at the file level, not the volume level. Thus, for example, files 1 and 3 could be encrypted, but not file 2.

In this embodiment, a control block is built for each tape Unit Control Block (UCB) the first time that unit is actually used. The encryption control block is built and chained to the other encryption control blocks by the dynamically-installed OPEN/CLOSE/EOV (O/C/EOV) exit during an OPEN process. Once the control block is built and anchored (or found in the chain if this is not the first OPEN) it will be anchored off the UCB as well. The Unit Control Block is updated to indicate if encryption/decryption services are required or not. This way, the intercept that receives control for every I/O to the device will be able to spend only a few instructions to obtain this control block (from its anchor point in the UCB itself) and determine if its services are required or not. If not, then the I/O will be able to continue with only a few lines of additional code to slow it down. If encryption/decryption services are required, then the intercept issues the calls to an encryption application 104 to actually perform the encryption or decryption and allow the I/O to complete and save any stats in the control block as it progresses. During CLOSE processing for the file, the O/C/EOV exit again gets control and clears the control block and passes along to an encryption utility 106 any stats that were saved in the control block by the intercept exit.

The encryption utility 106 takes any stats and updates the encryption database 102 as necessary. The encryption utility 106 may also act as a middle-man between the intercept exit and encryption application 104 and may also have an online interface to allow the creation and maintenance of the encryption database.

In the example embodiment, the encryption system provides a way of creating an encryption key from a pass phrase and allows a user to assign a logical name to that key. The user uses an interface 108 to enter a pass phrase and a keyname to associate with the resulting key. New keys entered via this interface are stored in the primary key table of the encryption database 102, but may be directed to a key table other than the primary table for the purpose of reading tapes from other encryption applications/systems. Key tables other than the primary key table are preferably used to decipher only, so imported key tables or keys entered through the encryption system interface 108 but directed to a table other than the primary are considered to be for decryption purposes only. Keys stored in the primary key table may be used for both creating and reading encrypted tapes. There is also a 2-byte sequence number associated with each key-name/key-table pair in the rare situation where a merge of multiple sites have the same pair of key-name/key-table. In this situation, each would have a unique sequence number. The pass phrase itself may be encrypted before being sent to the encryption utility 106. This prevents the original pass phrase from ever being in clear-text while on a network. The encryption used to communicate between the interface and the encryption utility may be either the public/private key (if available) or encrypted using a unique encryption.

The encryption application 104 is called to generate an encryption key using the pass phrase, and an encryption key label is generated to be associated with the encryption key in an encryption key dataset 110. System 100 then passes the encryption key or some derivation back to the encryption application 104 as an encryption/decryption key and gets it converted to an internal encryption token. The encryption application 104 is also called to store the internal token in the encryption key dataset 110 using the key label as the record's "handle." The system preferably does this multiple times with the same encryption key (e.g., once for each of the different types of encryption that is supported).

The keyname and the associated encryption key labels are passed to the encryption utility 106 where they are assigned a unique key ID number. The key ID number may be used by a tape management system (not shown) as a space saving shortcut to the key table and keyname relationship, and uniquely identifies a given key across all key tables. All of this is stored in the encryption database. The pass phrase is not stored anywhere, and the encryption key derived from that pass phrase is only stored in the encryption key dataset 110 where it is encrypted under the user's encryption master key.

An example encryption database layout is provided below:

| Field name | size | Usage |
| --- | --- | --- |
| Key-name | 8 | Basic name of the encryption name |
| Table-name | 8 | Usually defaults to the sysplex name |
| Sequence # | 2 | To handle rare situation where key-name and table-name are duplicated on a merge |
| Key-id | 2 | Unique number assigned to each entry |
| C-date | 4 | Date the key was created and added to the Cipher database |
| C-time | 4 | Time the key was created |
| C-user | 8 | Userid of the person that originally created this key |
| Retired-flag | 1 | Flag to indicate the key has been retired and should only be used for un-encryption |
| Eligible to be deleted | 1 | Flag that indicates that after the retired-flag has been turned on; the Tape Management System has been reviewed and no usages of this key were found. |
| Number of key-label cells | 1 | The number of key-label cells that will follow this field |
| — | — | The following 10 fields make up a single cell and are repeated as often as necessary. |
| Key-label-type | 8 | The type of key-label that will follow; DES64, AES256 are examples. |
| Key-label | 64 | Actual key-label stored in the CKDS by ICSF |
| Files-in | 4 | Number of files un-encrypted |
| L-date-in | 4 | Date this specific key was last used for encryption |
| L-time-in | 4 | Time this specific key was last used for encryption |
| Usage-in | 16 | Total number of K-bytes encrypted with this key |
| Time-spent-i | 16 | Time spent doing encryption with this key |
| Files-out | 4 | Number of files encrypted |
| L-date-out | 4 | Date this specific key was last used for decryption |
| L-time-out | 4 | Time this specific key was last used for decryption |
| Usage-out | 16 | Total number of K-bytes decrypted with this key |
| Time-spent-o | 16 | Time spend doing decryption with this key |

The last ten fields, for example, may be repeated multiple times, depending on how many types of encryption keys are being supported.

The online interface and encryption interface may also be able to perform lookups and simple inquiries to see how often each key has been used and other statistics. Also, the ability to "RETIRE" a key and to "DELETE" an already retired and un-used key may be provided via these components.

When a tape file is created, a new tape-exit intercept gets control. There, a decision based on information corresponding to the data set being created is used to determine if the file should be encrypted and what encryption method should be used. If the file does need to be encrypted, then the keyname and table name are stored in the header along with a 1 or 2-byte indicator as to the type of encryption used and a 1-byte indicator to tell which version of encryption was used. The table-name (8-bytes) may be stored in an encrypted format. This allows for confirmation that the correct key is being used during the un-encryption phase (when read for input) prior to the data being passed to the application. The OPEN process then performs setup functions for the subsequent encryption of the data to follow.

During OPEN, the tape-intercept queries the SMS system to determine if encryption is desired, and if encryption is desired what keyname and type of encryption is desired. For example, the SMS DATACLAS descriptor field might contain something like "CYPHER=(keyname,AES128)". This would indicate that encryption is desired, the keyname specified should be used, and the type of encryption desired is AES 128-bit encryption.

If encryption is to be performed, then the encryption utility calls the encryption application to retrieve the internal token. The encryption application returns the key table, the keyname, the key ID and the token to be used. The OPEN intercept then acquires the buffer(s) needed for encryption and updates an encryption control block containing pointer(s) to the buffers(s), the internal token to be used in the encryption process, and any other pertinent information required by the encryption process. Also, the encryption utility will update the statistics for the keyname to reflect another usage of this key.

The tape management exit is called to pass the key table, keyname, key ID, and other information. The tape products store the key ID in their respective databases.

Before allowing the OPEN process to complete, .the keyname (8-bytes), the key table (8-bytes encrypted), the encryption version number (1-byte) and an indicator as to the type of encryption used (1 or 2-bytes) will be stored in the user header. These 19-20 bytes may be stored in the "reserved" area in the header.

Also, one additional override may be allowed. In the rare situation where there are multiple key entries (e.g., because of a data center merger or a requirement to ship tapes to another party with a specific key-name that matches an existing keyname) the ability to specify by unique key ID which key should be used is provided.

If it is found that encryption services are to be performed, the encryption control block may be updated. An anchor to all control blocks is maintained. If this is the first time this specific Unit is being used, a new control block is built and added to the chain. Otherwise, the existing control block is being re-used. Once the control block has been found or created; it will also be anchored in the Unit Control Block extension itself. This allows the I/O intercept to find the control block quickly and easily. If a "retired key" is selected however, the job may be failed or a request may be issued asking for the correct key name to be used. The encryption control block may be defined as follows:

| Field name | size | Usage |
| --- | --- | --- |
| UCB-Numb | 4 | Unit number |
| Next UCBCB | 4 | Address of next Encryption Control Block |
| Addr-IOCB | 16 | Address of the Device I/O Control Block |
| Flag-1 | 1 | Misc flag byte |
| | X'80' | Encryption services are needed |
| | X'40' | UCB-CB has been fixed |
| | X'20' | |
| Flag-2 | | Misc flag byte |
| Key-label | 64 | ICSF key-label that should be used for encryption services |

With respect to tape I/O processing (output), the encryption system traps the data before it gets written, encrypts it, and then causes the encrypted data to be written. The encryption system may intercept the WRITE event in Start I/O processing. The system finds the control block built by OPEN and verifies the buffers are adequate for processing this channel program. If not, then new buffers are added to the buffer pool for this file. Each write event is updated with a corresponding address in a corresponding encryption buffer. For each complete block processed, the encryption application is invoked to encrypt the data into the corresponding encryption buffer. When the end of the write event is found, the Start I/O is re-driven with the updated encrypted buffer. Encryption buffers that have been used are marked as being in use. When the I/O completes, the system trap then marks the buffers as no longer in use. This allows for the unpredictable I/O logic of certain utilities.

The system then detects encrypted tapes and dynamically decrypts them. During tape OPEN processing, the system verifies that there is an entry with the keyname from the tape label (user label header), and that when used to decrypt the table name (also in the header) the table name matches what was used. If it does not, a check of the encryption database is performed to see if there is another match of the same keyname and that encryption will be used again. Either a successful un-encryption of the table name will be performed (in which case the correct encryption key has been found) or the table will be exhausted (in which case the OPEN will be failed). The encryption utility calls the encryption application to retrieve the internal token during these attempts. Once the correct key is located, the intercept then acquires the buffer(s) needed for decryption and builds a control block containing the pointer(s) to the buffers(s) and the internal token to be used in the decryption process. If a key was not located, the OPEN is failed. This prevents the application from failing because of bad data being returned to it from the encryption application. A similar process to OPEN/OUTPUT may be performed to insure that an encryption control block is present and anchored off the Unit Control Block extension itself.

With respect to tape I/O processing (input), the system traps the data after it gets read, decrypts it, and then passes the decrypted data back to the reader. The system may catch the READ event in Start I/O processing. The system finds the control block built by OPEN and verifies the buffers are adequate for processing this channel program. If not, then new buffers are added to the buffer pool for this file. Each READ event is updated with a corresponding address in a corresponding encryption buffer. When the end of the channel program is found, the Start I/O is re-driven with the channel program pointing to the encryption buffers. Encryption buffers that have been used are marked as being in use. When the I/O completes, the system trap processes the blocks just read. For each complete block read, the encryption application decryption service is invoked to decrypt the data into the user's original buffers. The system then marks the encryption buffers as no longer in use. This allows for the unpredictable I/O logic of certain utilities.

With respect to CLOSE processing, during CLOSE, the encryption intercept sends notification back to the encryption utility along with any statistics that might have been gathered. The encryption intercept then tears down the structure that was used to manage the encryption or decryption process that was just completed. This includes clearing the field in the Unit Control Block extension that points to the encryption control block. This prevents the accidental re-use if the next OPEN intercept is somehow missed and I/O takes place.

If the user wants to delete a key, there are preferably no rules defined that call for that keyname. The system queries SMS to see if the relevant keyname is currently in use. If not, then the system turns on the "retired flag" indicator in its database. This prevents the key from being used for encryption going forward, but will still allow the key to be used to un-encrypt any existing files.

An ancillary process may also be provided in which the system queries the tape management system to look for any active tape files that were encrypted using the specified key. If the tape management system does not find any active tape files encrypted with the specified key, the "eligible to be deleted" indicator is turned on. When both the "eligible to be deleted" indicator and the "retired flag" are both on the key may then be deleted from the encryption database. Without a tape management system, a simple double-question to the user will be executed and the key deleted.

When two data centers containing encrypted tapes are merged, the encryption key table from one data center is exported from the one encryption system and imported into the other encryption system. The import process assigns new key ID numbers to the imported encryption database records where the key ID would duplicate an ID in the existing key table. The system generates a control file describing the old key ID and the new key ID that was assigned. This control file is taken in by a merge application when the actual records are being copied from the importing center into the target center. The application updates the records as they are being merged in. If the client performs the merge before importing the encryption key table, an update should be performed for the volume ranges that were merged in. For tape management, appropriate update commands should be created to perform the key ID changes.

As the encryption system should trap all OPEN calls made by any process or application running on a system where the encryption system is active, it is preferable that the encryption system make a quick determination as to whether or not it must participate in the processing of file information at the Start I/O level. Also, when the encryption system determines that it must participate, it must also quickly determine the information required by that participation. As this information should be persistent across restarts of the encryption system, this information should be stored in persistent storage. However, while a persistent storage mechanism is preferable for retaining information over time, it may be desired that the implementation of that database facilitates lightweight and quick responsiveness characteristics.

For these and other reasons, according to one specific embodiment, the encryption database may be implemented using z/OS DIV (data-in-virtual) facilities. DIV processing uses a pre-allocated linear file as the persistent storage mechanism, but the I/O subsystem used to access this persistent storage is basically the same as that used by the z/OS operating system for virtual storage paging operations. This is considered to be the fastest data access method available in the z/OS environment.

By using DIV facilities as the database mechanism, one can view the database as a collection of control blocks chained together to create database structures and hierarchies without the programming overhead of creating and maintaining a more traditional database. The operating system basically "pages-in" data from the underlying pre-allocated linear file as virtual storage pages mapped to that file are touched, and "pages-out" any pages modified as needed, all without the encryption system having to perform any database calls or perform any special I/O on its own. Basically, accessing the database runs at virtual memory speeds. This approach may provide the fastest possible mechanism for a database backed by persistent storage, and at the same time the persistent storage can be shared across multiple systems.

Although particular embodiments of the method and apparatus of the present invention have been illustrated in the accompanying drawings and described in the foregoing detailed description, it will be understood that the invention is not limited to the embodiments disclosed, but is capable of numerous rearrangements, modifications, and substitutions without departing from the spirit of the invention.

What is claimed is:

1. A data storage device, comprising:
a storage medium, wherein the storage medium comprises a header portion;
a set of encrypted data stored on the storage medium;
an encryption key operable to enable a user to decrypt the encrypted data; and
an encryption indicator corresponding to the encryption key, the encryption indicator stored in the header portion of the storage medium, wherein the header portion is separate from a location of the set of encrypted data.

2. The data storage device of claim 1, wherein the encryption key is stored on the storage medium in a location separate from a location of the set of encrypted data.

3. The data storage device of claim 2, wherein the encryption key is stored in the same location as the encryption indicator.

4. The data storage device of claim 3, wherein the encryption key is encrypted.

5. The data storage device of claim 2, wherein the encryption key is stored on the storage medium in a location adjacent a location of the set of encrypted data.

6. The data storage device of claim 1, wherein the encryption key is stored on the storage medium within the set of encrypted data.

7. The data storage device of claim 1, wherein the storage medium is tape.

8. The data storage device of claim 1, wherein the storage medium is a storage disc.

9. The data storage device of claim 1, wherein the set of encrypted data is stored in a first pre-designated area on the storage medium and the encryption indicator is stored in a second pre-designated area on the storage medium.

10. The data storage device of claim 9, wherein the second pre-designated area comprises a label.

11. The data storage device of claim 9, wherein the second pre-designated area comprises a user label.

12. The data storage device of claim 9, wherein the second pre-designated area comprises a user header label.

13. The data storage device of claim 9, wherein the second pre-designated area comprises a user trailer label.

14. The data storage device of claim 1, wherein the encryption indicator indicates the existence of the encryption key.

15. The data storage device of claim 1, wherein the encryption indicator indicates a location of the encryption key.

16. The data storage device of claim 1, wherein the encryption indicator indicates a type of the encryption key.

17. The data storage device of claim 1, wherein the encryption indicator comprises unencrypted data.

18. A data encryption system for encrypting data, the system comprising:
a database;
an encryption application operable to encrypt data in a file being created on a storage medium, wherein the storage medium comprises a header portion; and
an encryption utility operable to recognize an encryption request and intercept a file creation process if the encryption request indicates that the data is to be encrypted, and further operable to call the encryption application to encrypt the data;
the encryption application further operable to generate an encryption key corresponding to the encrypted data to enable a user to decrypt the data;
the encryption utility further operable to generate encryption indicator information corresponding to the encryption key, the encryption indicator information being stored in the header portion of the storage medium, wherein the header portion is separate from a location wherein the encrypted data is stored.

19. The data encryption system of claim 18, wherein the encryption key is stored in the database in a key table and wherein the encryption indicator information enables retrieval of the encryption key.

20. The data encryption system of claim 18, wherein the encryption indicator information includes an encryption key identifier.

21. The data encryption system of claim 18, wherein the encryption indicator information is stored in a user label on the storage medium.

22. The data encryption system of claim 18, wherein the encryption indicator information is stored in a user header label on the storage medium.

23. The data encryption system of claim 18, wherein the encryption indicator information is stored in a user trailer label on the storage medium.

24. A method for storing data on a storage medium, comprising:
   determining whether the data is to be encrypted;
   if the data is to be encrypted, generating an encryption key;
   generating an encryption indicator associated with the encryption key;
   encrypting the data and storing the encrypted data on the storage medium in a first location; and
   storing the encryption indicator on the storage medium in a header portion of the storage medium, wherein the header portion is separate from the first location.

25. The method of claim 24, wherein the encryption indicator is not encrypted.

26. The method of claim 24, wherein the encryption key is stored in a third location on the storage medium.

27. The method of claim 26, wherein the first location is adjacent the third location.

28. The method of claim 24, wherein the encryption key is stored in the second location.

29. The method of claim 28, wherein the encryption key is encrypted.

30. The method of claim 24, wherein the encryption key is stored in the encrypted data.

31. The method of claim 24, wherein the encryption indicator is stored in a user label on the storage medium.

32. The method of claim 24, wherein the encryption indicator is stored in a user header label on the storage medium.

33. The method of claim 24, wherein the encryption indicator is stored in a user trailer label on the storage medium.

* * * * *